United States Patent
Kim (10) Patent No.: US 10,107,353 B2
(45) Date of Patent: Oct. 23, 2018

(54) NOZZLE PLATE OF ENGINE MOUNT

(71) Applicant: Hyundai Motor Company, Seoul (KR)

(72) Inventor: Hyo-Seok Kim, Gwangmyeong-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/364,080

(22) Filed: Nov. 29, 2016

(65) Prior Publication Data

US 2018/0051768 A1    Feb. 22, 2018

(30) Foreign Application Priority Data

Aug. 18, 2016    (KR) ........................ 10-2016-0104658

(51) Int. Cl.
*F16F 13/10*  (2006.01)
*B60K 5/12*   (2006.01)

(52) U.S. Cl.
CPC .......... *F16F 13/107* (2013.01); *B60K 5/1208* (2013.01); *F16F 13/10* (2013.01)

(58) Field of Classification Search
USPC ................ 267/140.11–140.15, 140.2–140.5, 267/141.1–141.7; 248/550, 562, 566
See application file for complete search history.

(56) References Cited

U.S. PATENT DOCUMENTS

| | | | | |
|---|---|---|---|---|
| 4,711,206 A * | 12/1987 | Andra | ..................... | F16F 13/22 248/636 |
| 4,753,422 A * | 6/1988 | Thorn | ................... | F16F 13/106 180/312 |
| 5,443,245 A * | 8/1995 | Bellamy | ................ | F16F 13/106 267/140.13 |
| 7,344,128 B2 * | 3/2008 | Muramatsu | ........... | F16F 13/106 267/140.13 |
| 8,196,700 B2 * | 6/2012 | Toba | ..................... | F16F 13/106 181/148 |
| 8,695,954 B2 * | 4/2014 | Ogawa | ................... | F16F 13/101 267/140.13 |
| 2006/0097435 A1 * | 5/2006 | Yoneyama | ............ | F16F 13/105 267/140.11 |
| 2006/0097436 A1 * | 5/2006 | Yamamoto | ............ | F16F 13/101 267/140.12 |

FOREIGN PATENT DOCUMENTS

| | | |
|---|---|---|
| JP | 2005-180543 A | 7/2005 |
| JP | 2006-038017 A | 2/2006 |
| JP | 2013-032828 A | 2/2013 |
| KR | 10-2014-0046901 A | 4/2014 |

\* cited by examiner

*Primary Examiner* — Christopher P Schwartz
(74) *Attorney, Agent, or Firm* — Morgan, Lewis & Bockius LLP (57) ABSTRACT

A nozzle plate of an engine mount may a lower nozzle plate which has a flow path groove formed in an upper surface, and a lower opening hole that communicates with the lower liquid chamber; an upper nozzle plate which is coupled to the lower nozzle plate so as to cover an upper side of the flow path groove and form a flow path, and has an upper opening hole that communicates with the upper liquid chamber; and a membrane which is mounted such that a rim portion thereof is engaged between the lower nozzle plate and the upper nozzle plate, and upper and lower surfaces thereof are exposed through the upper opening hole and the lower opening hole, respectively.

8 Claims, 6 Drawing Sheets

NOZZLE PLATE OF ENGINE MOUNT

CROSS-REFERENCE TO RELATED APPLICATIONS

The present application claims priority to Korean Patent Application No. 10-2016-0104658, filed on Aug. 18, 2016, the entire contents of which is incorporated herein for all purposes by this reference.

BACKGROUND OF THE INVENTION

Field of the Invention

The present invention relates to a nozzle plate of a hydraulic engine mount in which a hydraulic liquid is encapsulated and flows between an upper liquid chamber and a lower liquid chamber through a flow path formed in the nozzle plate, and more particularly, to a nozzle plate of an engine mount, which is capable of suppressing rattling noise of a membrane that is mounted on the nozzle plate and vibrates when a hydraulic liquid flows.

Description of Related Art

A hydraulic engine mount is configured to attenuate vibration in a high frequency region and a low frequency region, and widely used for various types of vehicles.

Figure 1:
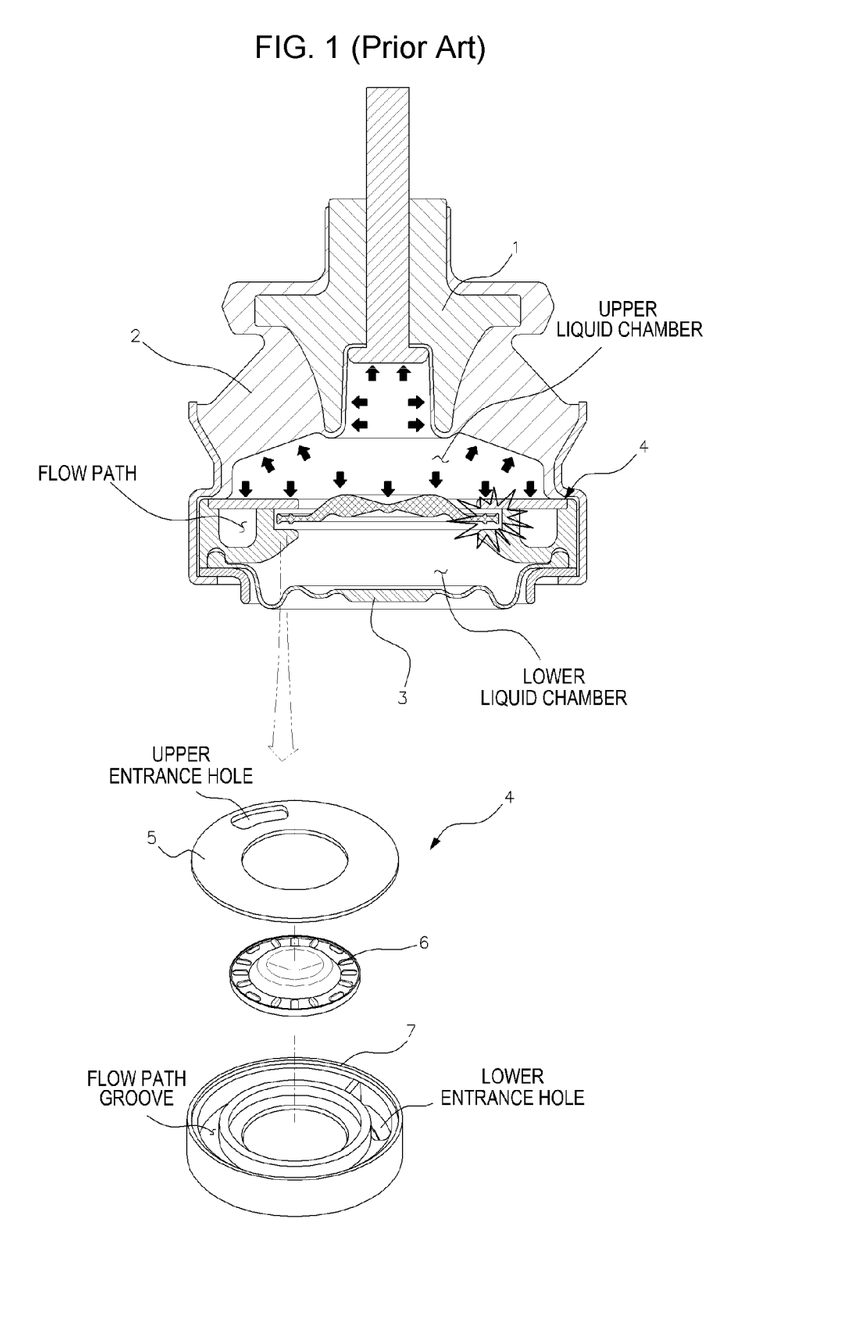
FIG. 1 is a view illustrating a longitudinal cross section of an engine mount in the related art, and a state in which a nozzle plate in the related art is disassembled.

FIG. 1 illustrates a state of an interior of a hydraulic engine mount (hereinafter, referred to as "engine mount") in the related art. Referring to FIG. 1, the engine mount has an internal space provided between an insulator 2 and a diaphragm 3, the predetermined amount of hydraulic liquid is encapsulated in the internal space, and the internal space is divided into an upper liquid chamber and a lower liquid chamber by a nozzle plate 4 mounted in the internal space.

The nozzle plate 4 is configured by coupling an upper nozzle plate 5, a lower nozzle plate 7, and a membrane 6, and a flow path is formed in the upper nozzle plate 5 and the lower nozzle plate 7 so that the hydraulic liquid may flow through the flow path.

That is, a circular flow path groove is formed in an upper surface of the lower nozzle plate 7, and the upper nozzle plate 5 is coupled onto the lower nozzle plate 7 so as to cover an upper side of the flow path groove, thereby forming the flow path. Further, a lower entrance hole and an upper entrance hole, which communicate with the flow path groove, are formed in the lower nozzle plate 7 and the upper nozzle plate 5, respectively, at both side ends of the flow path groove. Therefore, the flow path communicates with the lower liquid chamber through the lower entrance hole, and communicates with the upper liquid chamber through the upper entrance hole.

The membrane 6, which vibrates when the hydraulic liquid flows, is selectively mounted between the upper nozzle plate 5 and the lower nozzle plate 7. The membrane 6 is mounted such that a rim portion thereof is engaged between the upper nozzle plate 5 and the lower nozzle plate 7, and each of the upper nozzle plate 5 and the lower nozzle plate 7 has a shape having an opening hole so that the hydraulic liquid in the upper liquid chamber and the lower liquid chamber is in contact with the membrane.

With a change in load of an engine which is transmitted through a core 1, the insulator 2 is elastically deformed, and thus a volume of the upper liquid chamber is changed, and as a result, the hydraulic liquid flows between the upper liquid chamber and the lower liquid chamber through the flow path. In this case, in addition to the flow path, when the membrane vibrates, the hydraulic liquid flows through a gap formed at a portion where the membrane is engaged.

That is, in a situation in which large displacement behavior is inputted such as when a vehicle suddenly accelerates or travels on a rough road, the hydraulic liquid flows through the flow path so as to generate a relatively high damping value, and in a situation in which small displacement vibration is inputted such as when the vehicle travels on a normal road or an engine idles, the hydraulic liquid flows through the gap and the membrane vibrates, thereby generating a damping value.

However, in the case of a structure in the related art, there is a problem in that the rim portion of the membrane strikes the upper nozzle plate 5 and the lower nozzle plate 7 when the membrane vibrates, and as a result, abnormal noise occurs. To inhibit the occurrence of the abnormal noise, a method of reducing a clearance by increasing a thickness of a portion where the membrane 6 is engaged (semifixed membrane), or a method of completely fixing the membrane so that no clearance is formed (integrated membrane) is used in the related art.

However, there are problems in that if the thickness of the portion where the membrane is engaged is increased, a magnitude of abnormal noise is reduced, but dynamic characteristics are increased, and as a result, NVH (noise, vibration, harshness) performance deteriorates, and the structure in which the rim portion of the membrane 6 is fixed to the nozzle plate 4 degrades damping efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a nozzle plate of an engine mount capable of inhibiting the occurrence of abnormal noise of the membrane without causing deterioration in the NVH performance and damping efficiency.

An exemplary embodiment of the present invention provides a nozzle plate of an engine mount, which is mounted in the engine mount in which a hydraulic liquid is encapsulated, and divides an interior of the engine mount into an upper liquid chamber and a lower liquid chamber, the nozzle plate including: a lower nozzle plate which has a flow path groove formed in an upper surface, and a lower opening hole that communicates with the lower liquid chamber; an upper nozzle plate which is coupled to the lower nozzle plate so as to cover an upper side of the flow path groove and form a flow path, and has an upper opening hole which is disposed above the lower opening hole and communicates with the upper liquid chamber (when the upper nozzle plate is coupled to the lower nozzle plate); and a membrane which is mounted such that a rim portion thereof is engaged between the lower nozzle plate and the upper nozzle plate, and upper and lower surfaces thereof are exposed through the upper opening hole and the lower opening hole, respectively, in which at least one of the upper nozzle plate and the lower nozzle plate is configured such that a thickness thereof is gradually decreased so that a gap with the membrane is gradually increased from a point where the membrane is engaged toward a center of the membrane.

Through holes may be formed in an upper covering portion of the upper nozzle plate which defines a region in which a thickness is gradually decreased, and through holes may be formed in a lower covering portion of the lower nozzle plate which defines a region in which a thickness is gradually decreased.

The through holes may be disposed in a direction in which one end of the through hole is positioned at a point where a gap between the membrane and the upper nozzle plate or the lower nozzle plate is smallest, and the other end of the through hole is positioned at a point where a gap between the membrane and the upper nozzle plate or the lower nozzle plate is largest, and the plurality of through holes may be disposed in rows.

The upper covering portion and the lower covering portion may have the same area and the same shape, the upper opening hole and the lower opening hole may have the same area and the same shape, and the upper covering portion and the lower covering portion may be symmetrical with respect to the upper opening hole and the lower opening hole, respectively.

In the exemplary embodiment of the present invention, the membrane may be formed to have a quadrangular plate shape, and the upper covering portion and the lower covering portion may be formed to have a rectangular shape so as to be symmetrical with respect to the upper opening hole and the lower opening hole, respectively.

Ribs may be formed on one or more of the upper and lower surfaces of the membrane so that the membrane is in contact with the upper nozzle plate and the lower nozzle plate at a point where the gap is largest, and the rib may be formed in a '+' shape.

The membrane may be manufactured by using a material having elasticity, an inner metal member, which is made of metal and has a plate shape, may be embedded in the membrane, and a deformation inducing hole may be formed in the inner metal member so that the membrane is easily and elastically deformed at a portion where the rib is positioned.

The present invention additionally provides another exemplary embodiment. Another exemplary embodiment of the present invention provides a nozzle plate of an engine mount, which is mounted in the engine mount in which a hydraulic liquid is encapsulated, and divides an interior of the engine mount into an upper liquid chamber and a lower liquid chamber, the nozzle plate including: a lower nozzle plate which has a flow path groove formed in an upper surface, and a lower opening hole that communicates with the lower liquid chamber; an upper nozzle plate which is coupled to the lower nozzle plate so as to cover an upper side of the flow path groove and form a flow path, and has an upper opening hole which is disposed above the lower opening hole and communicates with the upper liquid chamber; and a membrane which is mounted such that a rim portion thereof is engaged between the lower nozzle plate and the upper nozzle plate, and upper and lower surfaces thereof are exposed through the upper opening hole and the lower opening hole, respectively, in which the membrane is configured such that a thickness thereof is gradually decreased so that a gap with at least one of the upper nozzle plate and the lower nozzle plate is gradually increased from a point where the membrane is engaged between the upper nozzle plate and the lower nozzle plate. Also in this exemplary embodiment, the membrane may be manufactured by using a material having elasticity, and inner metal member, which is made of metal and has a plate shape, may be embedded in the membrane.

The present invention having the aforementioned configurations is made by collecting only the advantage of a semifixed membrane (this is advantageous in improving dynamic characteristics because a fluid flow is absorbed) and the advantage of an integrated membrane (this is advantageous in inhibiting the occurrence of abnormal noise because relative motion between the membrane and the nozzle plate does not occur), and as a result, it is possible to improve dynamic characteristics, increase NVH performance, and inhibit the occurrence of abnormal noise.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, the present invention will be described in detail with reference to the accompanying drawings so that those skilled in the technical field to which the present invention pertains may easily carry out the present invention. However, the present invention may be implemented in various different ways, and is not limited to the exemplary embodiment described herein.

A part irrelevant to the description will be omitted to clearly describe the present invention, and the same or similar constituent elements will be designated by the same reference numerals throughout the specification.

In addition, terms or words used in the specification and the claims should not be interpreted as being limited to a general or dictionary meaning and should be interpreted as a meaning and a concept which conform to the technical spirit of the present invention based on a principle that an inventor can appropriately define a concept of a term in order to describe his/her own invention by the best method.

The present invention relates to a nozzle plate of an engine mount, which is mounted in the engine mount in which a hydraulic liquid is encapsulated, and divides an internal space between an insulator and a diaphragm into an upper liquid chamber and a lower liquid chamber, and hereinafter, an exemplary embodiment of the present invention will be described in more detail with reference to the drawings.

Figure 2:
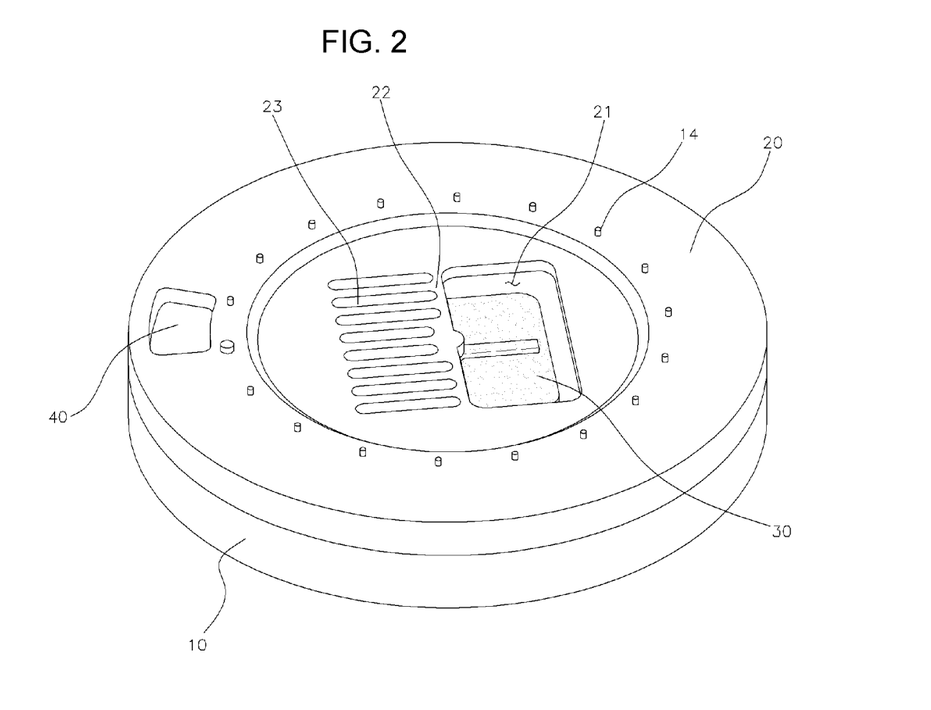
FIG. 2 is a perspective view of a nozzle plate according to an exemplary embodiment of the present invention.
Figure 3:
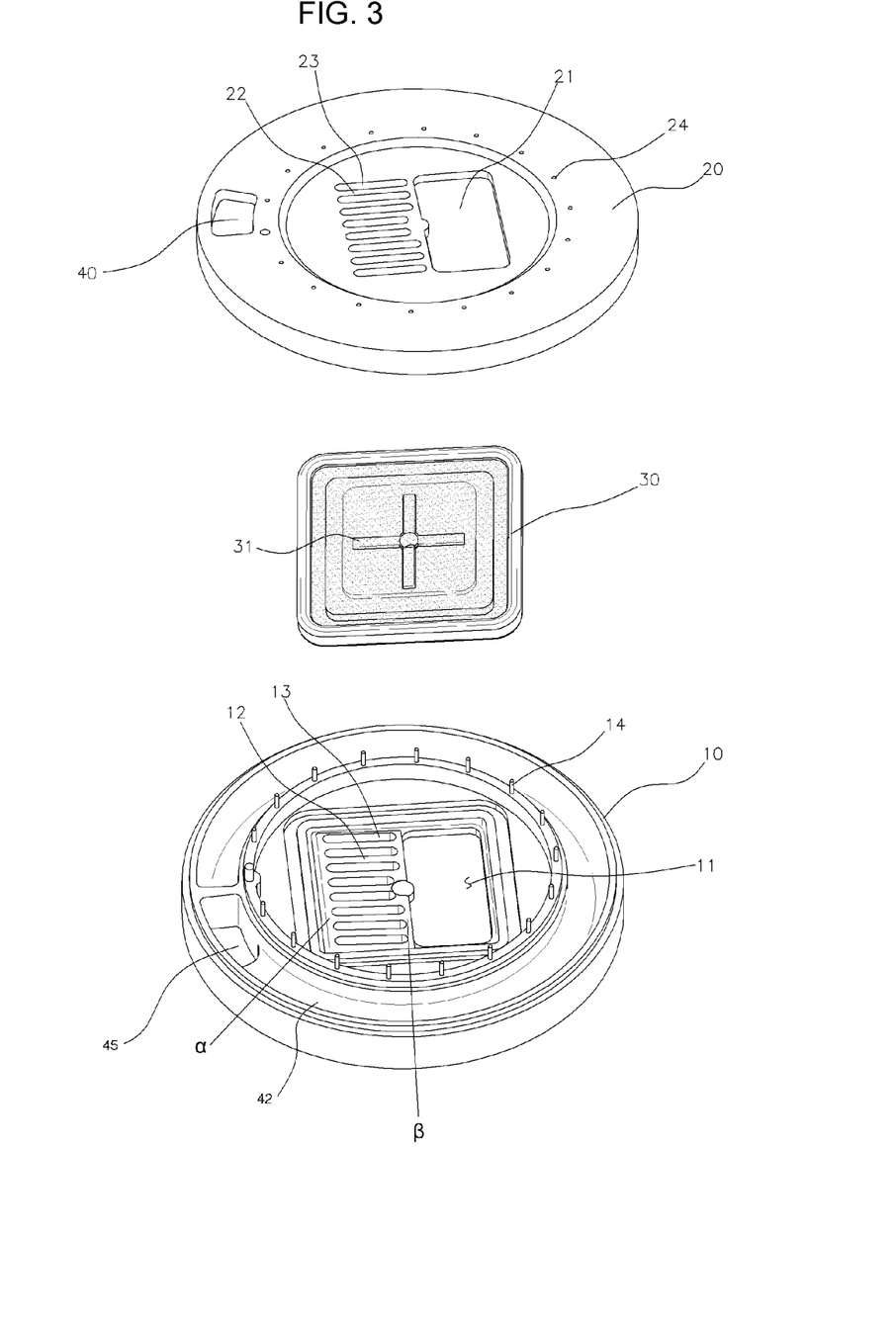
FIG. 3 is a view illustrating a state in which the nozzle plate illustrated in FIG. 2 is disassembled.

Referring to FIGS. 2 and 3, a nozzle plate according to the present invention is configured by coupling an upper nozzle plate 20, a membrane 30, and a lower nozzle plate 10, in which a lower entrance hole 45 and an upper entrance hole 40 are formed in the lower nozzle plate 10 and the upper nozzle plate 20.

A flow path groove 42 is formed in an upper surface of the lower nozzle plate 10, a lower opening hole, which communicates with the lower liquid chamber, is formed in the lower nozzle plate 10, and a lower covering portion 12, which defines a region in which a thickness is gradually decreased, is formed adjacent to the lower opening hole 11. The upper nozzle plate 20 is coupled to the lower nozzle plate 10 so as to form a flow path by covering an upper side of the flow path groove, and an upper opening hole, which allows the flow path and the upper liquid chamber to communicate with each other when the upper nozzle plate 20 is coupled to the lower nozzle plate 10, is formed in the upper nozzle plate 20. The upper nozzle plate 20 also has an upper covering portion 22 which defines a region in which a thickness is gradually decreased, and the upper covering portion 22 is disposed above the lower covering portion 12 so as to be in parallel with the lower covering portion 12. The membrane 30 is mounted such that a rim portion of the membrane 30 is engaged between the lower nozzle plate 10 and the upper nozzle plate 20, an upper surface of the membrane 30 is positioned below the upper opening hole 21 and the upper covering portion 22, and a lower surface of the membrane 30 is positioned above the lower opening hole 11 and the lower covering portion 12. For reference, the upper nozzle plate 20 and the lower nozzle plate 10 according to the present invention may be easily coupled by protrusions 14 and holes 24 fitted with each other.

Figure 5:
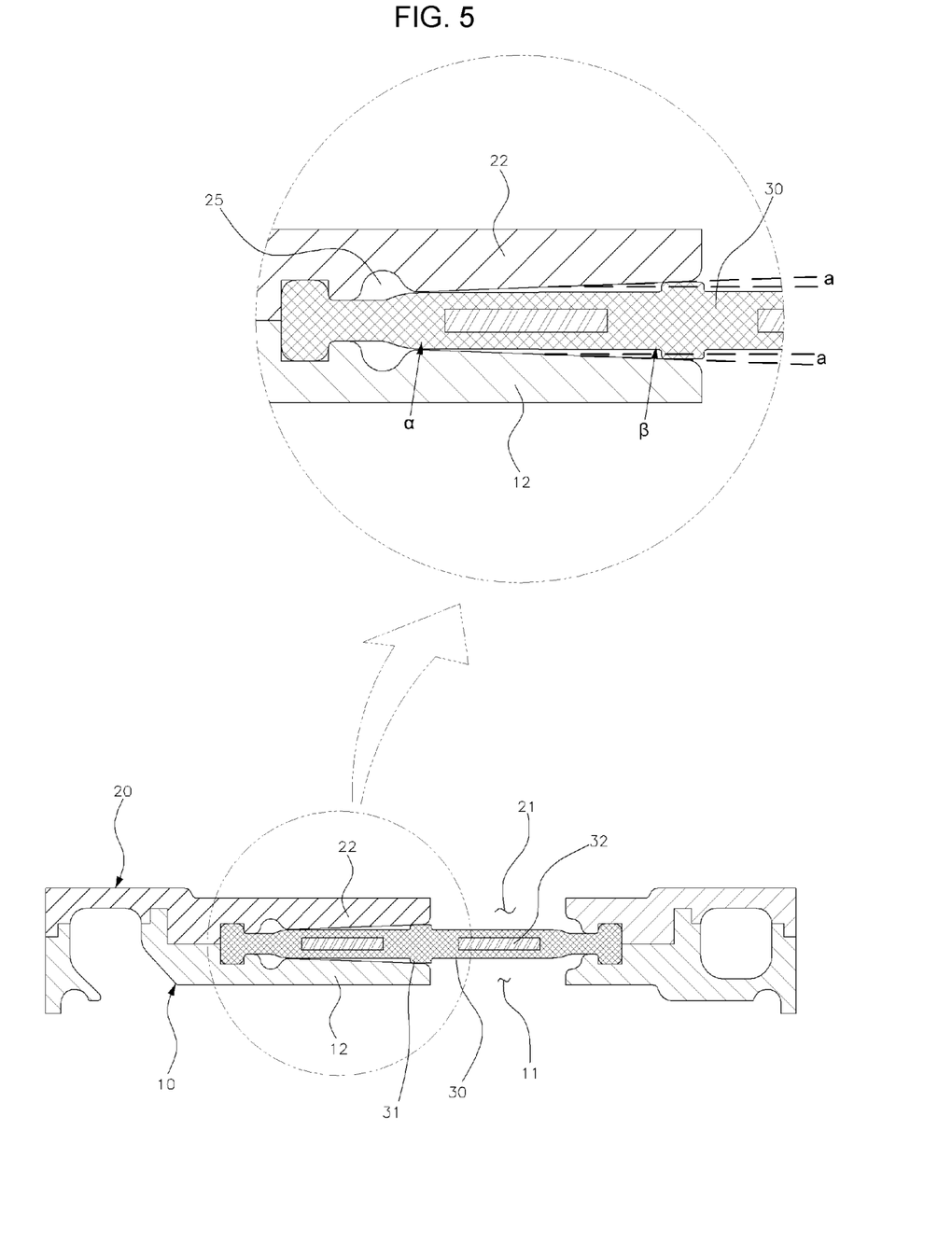
FIG. 5 is a view illustrating a cross section of the nozzle plate according to the exemplary embodiment of the present invention.

At least one of the upper covering portion 22 and the lower covering portion 12 of the upper nozzle plate 20 and the lower nozzle plate 10 is configured such that a thickness thereof is gradually decreased from a point where the membrane 30 is engaged (toward the center of the membrane) so that a gap with the membrane 30 is gradually increased. That is, at least one (any one of both or particularly both) of the upper covering portion 22 and the lower covering portion 12 has a shape having a thickness gradually decreased from a point α toward a point (3 as indicated in FIGS. 2 and 5, and as a result, a gap a is gradually increased from a point where the membrane is engaged (in the vicinity of the point α) toward a point adjacent to the upper opening hole 21 or the lower opening hole 11 (in the vicinity of the point β).

Through holes 23 and 13 are formed in the upper covering portion 22 and the lower covering portion 23, respectively, so that pressure of the hydraulic liquid may be transmitted to the membrane 30, and the through holes 23 and 13 are disposed in a direction in which one end of each of the through holes 23 and 13 is positioned at a portion (the point α) where a gap between the membrane 30 and the upper nozzle plate 20 or the lower nozzle plate 10 is smallest, and the other end thereof is positioned at a portion (the point β) where a gap between the membrane 30 and the upper nozzle plate 20 or the lower nozzle plate 10 is largest, and the plurality of through holes 23 and 13 is disposed in rows.

In the exemplary embodiment of the present invention, the membrane 30 is formed to have a quadrangular plate shape, and the upper covering portion 22 and the lower covering portion 12 are formed to have a rectangular shape so as to be symmetrical with respect to the upper opening hole 21 and the lower opening hole 11. That is, the upper covering portion 22 and the lower covering portion 12 have a rectangular shape having the same area and the same shape, the upper opening hole 21 and the lower opening hole 11 have a rectangular shape having the same area and the same shape, and the upper covering portion 22 and the lower covering portion 12 are disposed at positions which are symmetrical with respect to the upper opening hole 21 and the lower opening hole 11, respectively.

Ribs 31 are formed at one or more positions of an upper surface and a lower surface of the membrane 30 so that the membrane 30 comes into direct contact with the upper nozzle plate 20 and the lower nozzle plate 10 at a point where the gap is largest, and the rib 31 is formed in a '+' shape.

Figure 4:
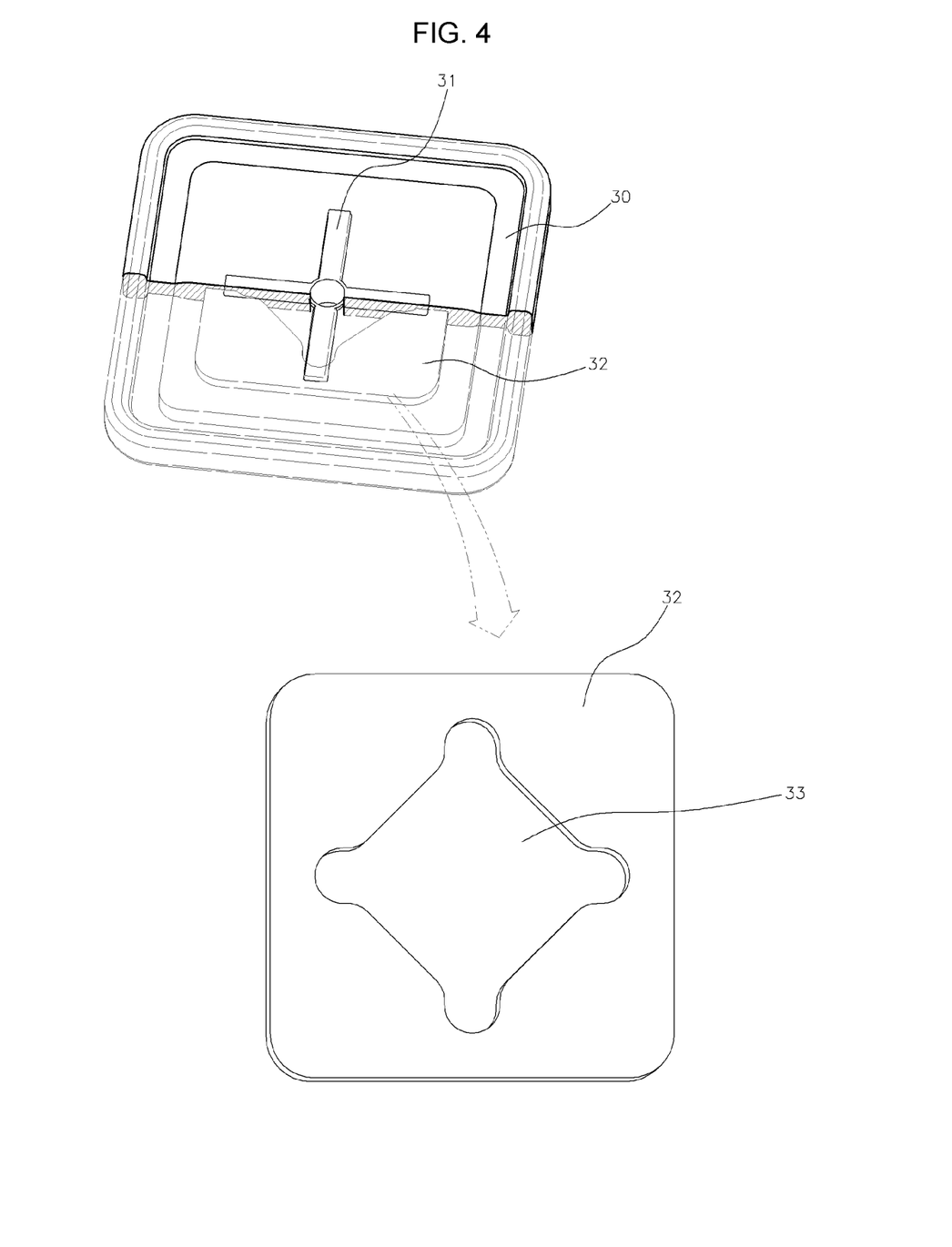
FIG. 4 is a view illustrating a membrane according to an exemplary embodiment of the present invention by partially penetrating the membrane, and illustrating an inner metal member embedded in the membrane.

The membrane 30 is manufactured by using a material having elasticity, and as illustrated in FIG. 4, an inner metal member 32, which is made of metal and has a plate shape, is embedded in the membrane 30. A deformation inducing hole 33 is formed in the inner metal member 32 so that the membrane 30 may be easily and elastically deformed at a portion where the rib 31 is positioned.

Therefore, as illustrated in FIG. 5, in the nozzle plate according to the present invention, the upper nozzle plate 20 and the lower nozzle plate 10 fix the quadrangular membrane 30 by compressing the rim portion of the membrane 30, and each of the upper covering portion 22 and the lower covering portion 12, which are seating surfaces that face the upper and lower surfaces of the membrane 30, respectively, is formed with a tapered surface facing the membrane 30, and as a result, the upper covering portion 22 and the lower covering portion 12 gradually come into contact with the membrane 30 (when the membrane vibrates). That is, the upper covering portion 22 and the lower covering portion 12 are almost continuously in contact with the membrane 30 at the point α, but the upper covering portion 22 and the lower covering portion 12 come into contact with the membrane 30 at the point β only when the membrane 30 greatly vibrates.

Expanded grooves are formed in the upper nozzle plate 20 and the lower nozzle plate 10 in the vicinity of the point α, and as a result, it is possible to minimize a collision between the membrane 30 and the upper nozzle plate 20 and between the membrane 30 and the lower nozzle plate 10. Further, since the through holes 23 and 13 are formed in the upper covering portion 22 and the lower covering portion 12, respectively, pressure of the hydraulic liquid may be appropriately applied to the membrane 30.

In the present invention, the membrane 30 is formed in a quadrangular shape such that one half of the membrane 30 is covered by the upper covering portion 22 and the lower covering portion 12, and the remaining half of the membrane 30 is exposed through the upper opening hole 21 and the lower opening hole 11, and the upper covering portion 22 and the lower covering portion 12 have a tapered shape, and as a result, when pressure of the hydraulic liquid is applied, the membrane 30 gradually comes into contact with the upper nozzle plate 20 and the lower nozzle plate 10 from the point (the point α) where the gap is small, and as a result, collision energy may be dispersed, and thus abnormal noise may be reduced (i.e., the membrane performs rotational motion about a side where the gap is small, and vibration is increased as a distance from the rotation center increases, but the membrane is not in contact with the upper nozzle plate 20 and the lower nozzle plate 10 at the upper opening hole and the lower opening hole, and as a result, an impact may be blocked).

The present invention additionally provides another exemplary embodiment. Another exemplary embodiment of the present invention also has a structure in which the membrane is fitted between the upper nozzle plate and the lower nozzle plate, the flow path groove is formed in the upper surface of the lower nozzle plate, the lower opening hole, which communicates with the lower liquid chamber, is formed in the lower nozzle plate, the upper nozzle plate is coupled to the lower nozzle plate so as to cover an upper side of the flow path groove and form the flow path, and the upper opening hole, which communicates with the upper liquid chamber, is formed above the lower opening hole.

Figure 6:
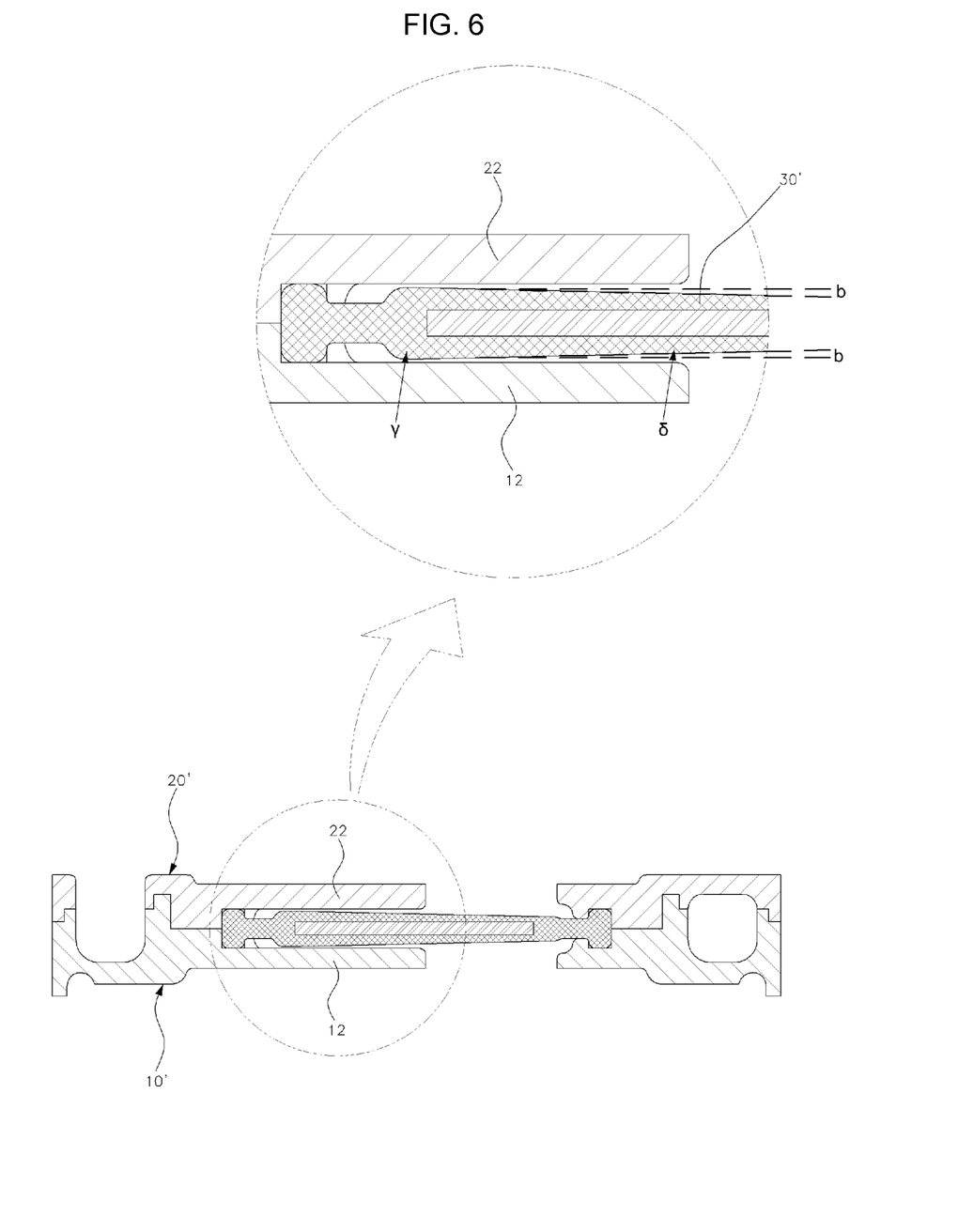
FIG. 6 is a view illustrating a cross section of a nozzle plate according to another exemplary embodiment of the present invention.

However, unlike the first exemplary embodiment, a part of each of an upper nozzle plate 20' and a lower nozzle plate 10' does not have a tapered shape, but instead a membrane 30' has a tapered shape. That is, as illustrated in FIG. 6, each of the upper nozzle plate 20' and the lower nozzle plate 10' has a flat surface that faces the membrane 30', and the membrane 30' has a thickness gradually decreased so that gaps b between the membrane 30' and the upper nozzle plate 20' and between the membrane 30' and the lower nozzle plate 10' are gradually increased from a point γ to a point δ. Also in the exemplary embodiment, the membrane 30' may be manufactured by using a material having elasticity, and inner metal member, which is made of metal and has a plate shape, may be embedded in the membrane 30'.

The present invention having the aforementioned configurations is advantageous in improving dynamic characteristics since gradual contact between the membrane 30 and the upper nozzle plate 20 and between the membrane 30 and the lower nozzle plate 10 is induced and a flow of the hydraulic liquid is absorbed, and the present invention is advantageous in inhibiting the occurrence of abnormal noise because no relative motion occurs between the membrane 30 and the upper nozzle plate 20 and between the membrane 30 and the lower nozzle plate 10, and as a result, it is possible to improve dynamic characteristics and increase NVH performance in comparison with the structure in the related art.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A nozzle plate of an engine mount, which is mounted in the engine mount in which a hydraulic liquid is encapsulated, and divides an interior of the engine mount into an upper liquid chamber and a lower liquid chamber, the nozzle plate comprising:
   a lower nozzle plate which has a flow path groove formed in an upper surface, and a lower opening hole that fluidly-communicates with the lower liquid chamber;
   an upper nozzle plate which is coupled to the lower nozzle plate to cover an upper side of the flow path groove and form a flow path, and has an upper opening hole that fluidly-communicates with the upper liquid chamber; and
   a membrane which is mounted such that a rim portion thereof is engaged between the lower nozzle plate and the upper nozzle plate, and upper and lower surfaces thereof are exposed through the upper opening hole and the lower opening hole, respectively,
   wherein at least one of the upper nozzle plate and the lower nozzle plate is configured such that a thickness thereof is gradually decreased so that a gap with the membrane is gradually increased from a point where the membrane is engaged toward a center of the membrane,
   wherein ribs are formed on at least one of the upper and lower surfaces of the membrane so that the membrane is in contact with the upper nozzle plate and the lower nozzle plate at a point where the gap is largest, and
   wherein through holes are formed in an upper covering portion of the upper nozzle plate which defines a region in which a thickness is gradually decreased, and through holes are formed in a lower covering portion of the lower nozzle plate which defines a region in which a thickness is gradually decreased.

2. The nozzle plate of claim 1, wherein the upper covering portion and the lower covering portion have a same area and a same shape, the upper opening hole and the lower opening hole have a same area and a same shape, and the upper covering portion and the lower covering portion are symmetrical with respect to the upper opening hole and the lower opening hole, respectively.

3. The nozzle plate of claim 2, wherein the membrane is formed to have a quadrangular plate shape.

4. The nozzle plate of claim 3, wherein the upper covering portion and the lower covering portion have a rectangular shape to be symmetrical with respect to the upper opening hole and the lower opening hole, respectively.

5. The nozzle plate of claim 4, wherein the membrane is manufactured by using a material having elasticity, and an inner metal member, which includes metal and has a plate shape, is embedded in the membrane.

6. The nozzle plate of claim 5, wherein a deformation inducing hole is formed in the inner metal member so that the membrane is easily and elastically deformed at a portion where the rib is positioned.

7. The nozzle plate of claim 4, wherein the rib is formed in a '+' shape.

8. The nozzle plate of claim 1, wherein the through holes are disposed in a direction in which a first end of the through hole is positioned at a point where a gap between the membrane and the upper nozzle plate or the lower nozzle plate is smallest, and a second end of the through hole is positioned at a point where a gap between the membrane and the upper nozzle plate or the lower nozzle plate is largest, and the plurality of through holes is disposed in rows.

* * * * *